Aug. 16, 1932.  A. J. GURNEY  1,871,516
FEED WHEEL
Filed Nov. 16, 1929   2 Sheets-Sheet 1

Inventor
A. J. Gurney
By Harry Frease
Attorney

Aug. 16, 1932. A. J. GURNEY 1,871,516
FEED WHEEL
Filed Nov. 16, 1929 2 Sheets-Sheet 2
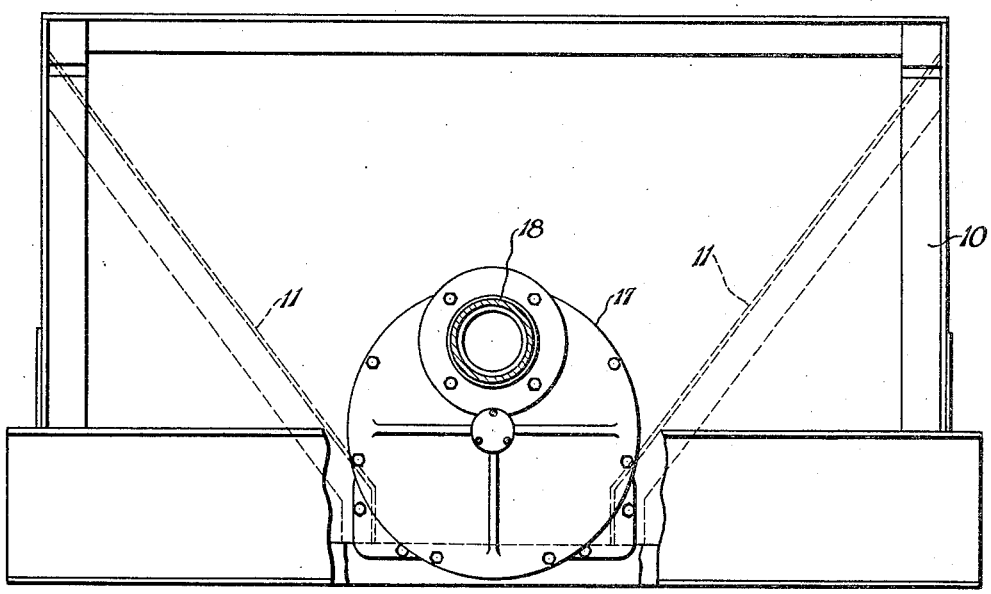
Fig. 3
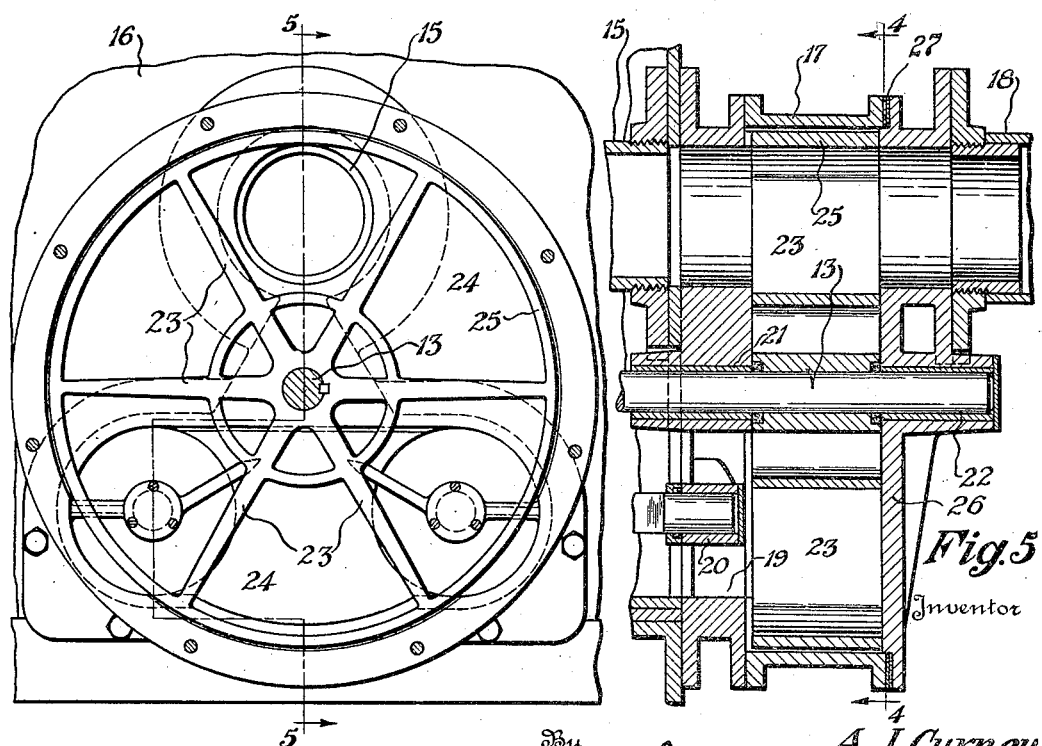
Fig. 4
Fig. 5

Patented Aug. 16, 1932

1,871,516

UNITED STATES PATENT OFFICE

ALBERT J. GURNEY, OF CANTON, OHIO, ASSIGNOR TO THE AMERICAN MINE DOOR COMPANY, OF CANTON, OHIO, A CORPORATION OF OHIO

FEED WHEEL

Application filed November 16, 1929. Serial No. 407,674.

The invention relates to a feed wheel for use in connection with a blower especially designed for blowing pulverized material; the invention being particularly adapted for application to a rock duster for use in dusting mines and the like as disclosed in my pending application, Serial No. 233,407, filed November 15, 1927.

The object of the improvement is to provide a feed wheel in the line between a blower and a nozzle or the like, the device being arranged to receive the rock dust or other pulverized material from a hopper and convey it uniformly into the air blast, at the same time preventing the blast of air from passing backward into the pulverized material in the hopper.

The above and other objects may be attained by providing in combination with a hopper having an air blast pipe located therethrough, and a conveyor therein, a feed wheel comprising a plurality of radial spokes or blades rotatably mounted within a housing communicating at its lower portion with the hopper, and preferably provided with a peripheral rim, the air blast passing through the upper portion of the housing, whereby pulverized material is conveyed from the hopper into the lower portion of the housing, the radial spokes or blades carrying the material upward into the air blast and acting themselves, together with the peripheral rim, to prevent the air blast passing into the hopper.

Figure 1:
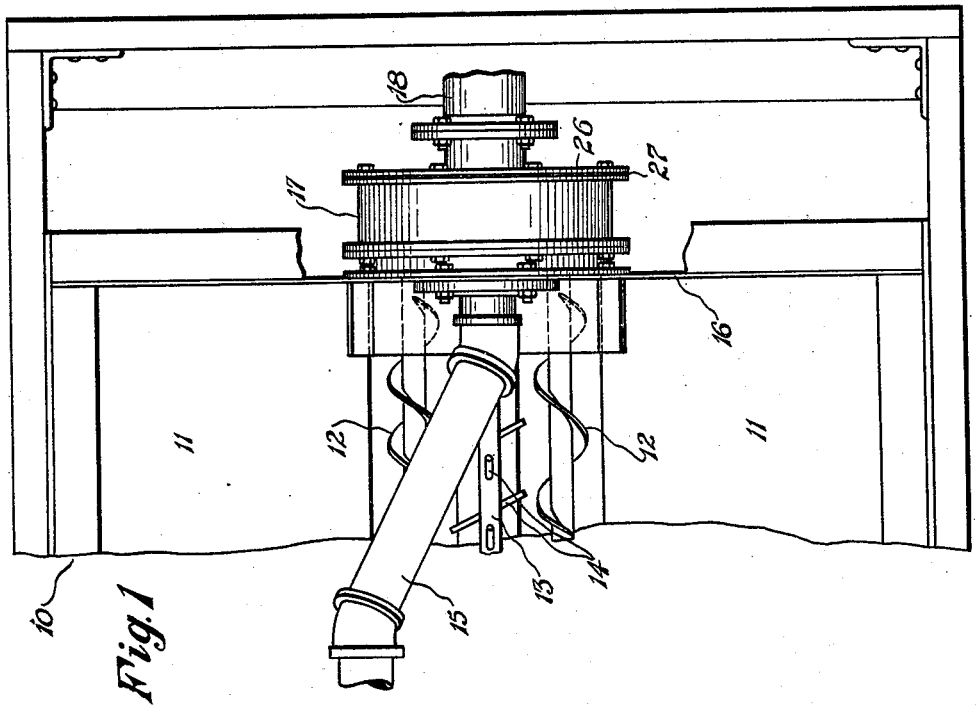
Figure 2:
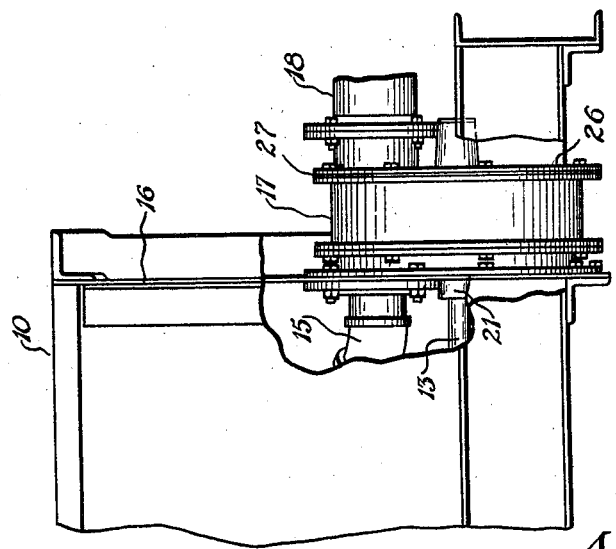

An embodiment of the invention is illustrated in the accompanying drawings, in which Figure 1 is a fragmentary plan view of a portion of the hopper and blower line, showing the improved feed wheel;

Fig. 2, a side elevation of the same;

Fig. 3, a front elevation of the same;

Fig. 4, an enlarged section on the line 4—4, Fig. 5; and

Fig. 5, a section on the line 5—5, Fig. 4.

Similar numerals refer to similar parts throughout the drawings.

The invention is illustrated as applied to a rock duster designed to be moved through mine tunnels and the like, as upon a railroad track for the purpose of blowing rock dust onto the walls and floors of the tunnels to mix with the coal dust and prevent explosions.

For this purpose the apparatus may comprise a hopper car shown generally at 10 and provided with railroad wheels (not shown), the hopper being filled with powdered limestone or the like and provided with agitating and conveying mechanism for feeding the rock dust to the feed wheel which conveys the same to an air line provided with a blower (not shown), by means of which the rock dust is blown through a nozzle or the like and distributed over the walls and floors of the mine tunnels.

The hopper car is provided with the downwardly and inwardly inclined walls 11 and for the purpose of carrying the powdered rock dust forward through the bottom of the hopper and feeding it to the improved feed wheel to be hereinafter described, a pair of conveyer screws 12 may be located in parallel relation in the bottom of the hopper.

In order to prevent caking or packing of the rock dust in the bottom of the hopper, as well as to assist the conveyer screws in feeding the dust forward, an agitating device may be provided. This agitator may comprise the shaft 13 located slightly above the conveyer screws and parallel with and equally spaced therefrom.

Inclined pins or fingers 14 may be carried by the agitator shaft for continually agitating the rock dust and the shaft is preferably continuously rotated in the opposite direction to that of the conveyer screws.

A blower of any suitable and well known construction may be carried upon the hopper car and communicates with the blower pipe 15 leading through the end wall 16 of the hopper and communicating with the upper portion of the closed valve housing 17 which is of substantially circular construction and is carried upon the end wall 16.

A pipe 18 communicates with the housing 17, in alinement with the blower pipe 15, and may have a nozzle or the like attached thereto for spraying the rock dust. An opening 19 is formed in the housing and provided with a bearing 20 to support the adjacent end of each conveyer shaft 12 and provide a communication between the conveyors and the housing.

The agitator shaft 13 extends through a bearing 21 between the end wall 16 of the hopper and the housing, being extended entirely through the housing and received in another bearing 22 upon the outer side thereof.

The improved feed wheel to which the invention pertains is mounted upon the agitator shaft, within the housing 17, and comprises a plurality of radial spokes or blades 23, preferably six as shown in the drawings, and may include the peripheral rim 25 connected to the end portions of the spokes or blades.

As best shown in Fig. 4, it will be seen that as each of the V-pockets 24, formed between adjacent spokes or blades, registers with the blower pipe, two of the pockets register with the conveyers so that as the uppermost pocket is being emptied by the blower, two pockets are being filled by the conveyers.

It will be evident that the adjacent spokes or blades 23 forming each pocket, together with the corresponding portion of the rim 25, provide means preventing the air blast from passing downward through the valve and back into the conveyer.

A uniform amount of rock dust will be delivered to the blower as each pocket moves into place, thus providing for a uniform and substantially continuous blast of rock dust through the blower pipe and nozzle.

For the purpose of taking up the housing to compensate for wear therein, or the end plate 26, shims 27 may be provided between the hopper 17 and the end plate 26 thereof.

It should be understood that the housing in which the feed wheel is located may be positioned at either the side or end of the hopper as desired, and where this housing is referred to in the claims as located at the "side" of the hopper it is intended to include either the side or end thereof.

I claim:

1. In combination with a hopper having a blower pipe, an agitator shaft and a conveyer therein, a closed housing at one side of the hopper and communicating at its upper portion with the blower pipe and at its lower portion only with the conveyer, a feed wheel upon the agitator shaft and entirely enclosed within the housing for carrying material upward within the housing from the conveyer to the blower pipe, and for preventing air from the blower pipe from entering the conveyer.

2. In combination with a hopper having a blower pipe, an agitator shaft and a conveyer therein, a closed housing at one side of the hopper and communicating at its upper portion with the blower pipe and at its lower portion only with the conveyer, a feed wheel entirely enclosed within the housing comprising a plurality of radial spokes, for carrying material upward within the housing from the conveyer to the blower pipe, and for preventing air from the blower pipe from entering the conveyer.

In testimony that I claim the above, I have hereunto subscribed my name.

ALBERT J. GURNEY.